Feb. 6, 1951 G. C. MOLOTZAK 2,540,278
SOLID FUEL IGNITING DEVICE RESPONSIVE
TO FURNACE TEMPERATURES
Filed Sept. 3, 1948 2 Sheets-Sheet 2

Inventor

George C. Molotzak

By Clarence A. O'Brien
and Harvey B. Jacobson
Attorneys

Patented Feb. 6, 1951

2,540,278

UNITED STATES PATENT OFFICE 2,540,278

SOLID FUEL IGNITING DEVICE RESPONSIVE TO FURNACE TEMPERATURES

George C. Molotzak, Coaldale, Pa.

Application September 3, 1948, Serial No. 47,691

7 Claims. (Cl. 110—1)

This invention relates to electrical means for igniting solid fuel of comparatively high carbon content in furnaces to start a fire therein or to ignite additional fuel and increase combustion thereof should the fire become low.

The primary object of the present invention is to provide a device of the above kind which is thermostatically controlled to automatically maintain efficient operation of or satisfactory combustion of fuel in the furnace.

Another object is to provide a device of the above kind including spaced electrically insulated electrodes carried by the furnace grate and adapted to be bridged by part of the fuel so that the latter is rendered incandescent when current is passed through the same from one electrode to the other.

A further object is to provide a simple and efficient device of the above kind which is so designed as to meet the requirements for its successful commercial use, and wherein continued overloading of the load circuit is prevented.

The exact nature of the present invention, as well as other objects and features thereof, will become apparent from the following description when considered in connection with the accompanying drawings, in which.

Figure 1:
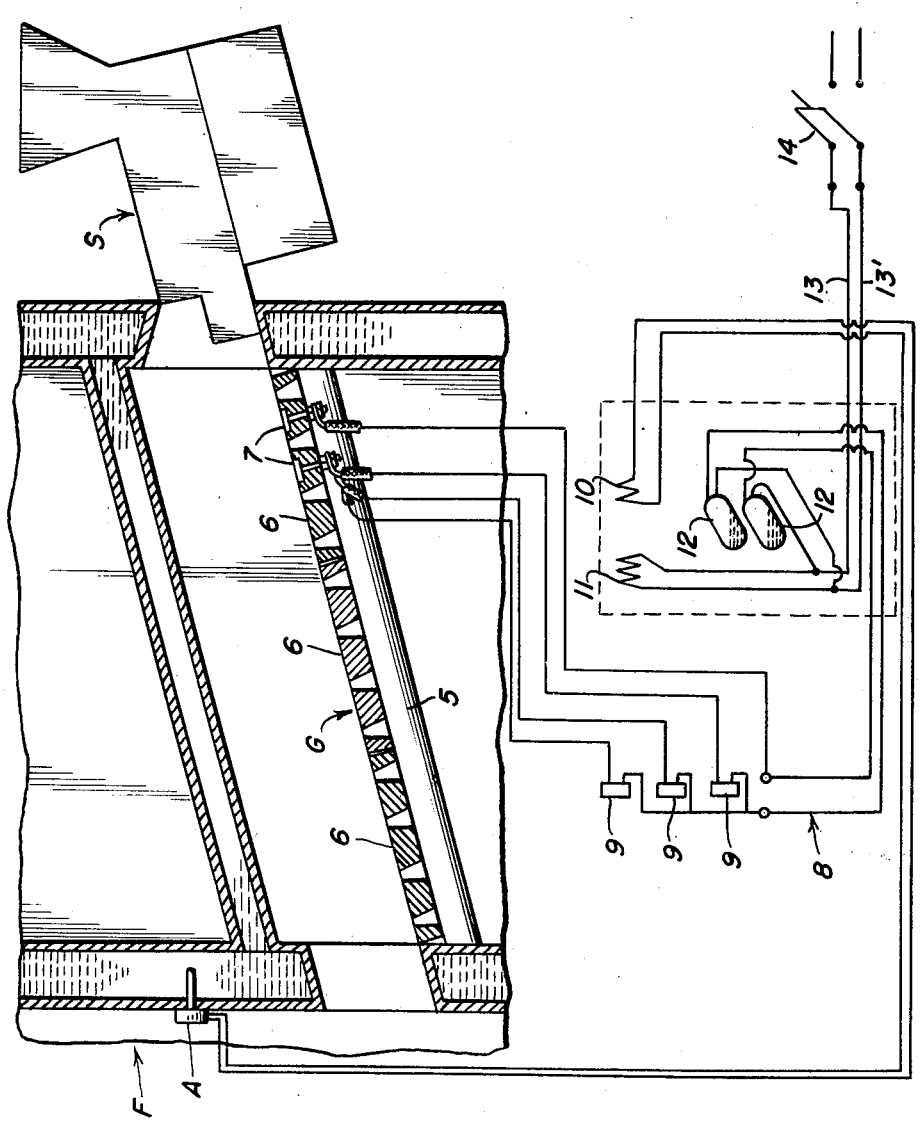
Figure 1 is a partly diagrammatic view showing a device embodying the present invention operatively associated with a furnace, a fragment of the furnace being shown in vertical section.
Figure 2:
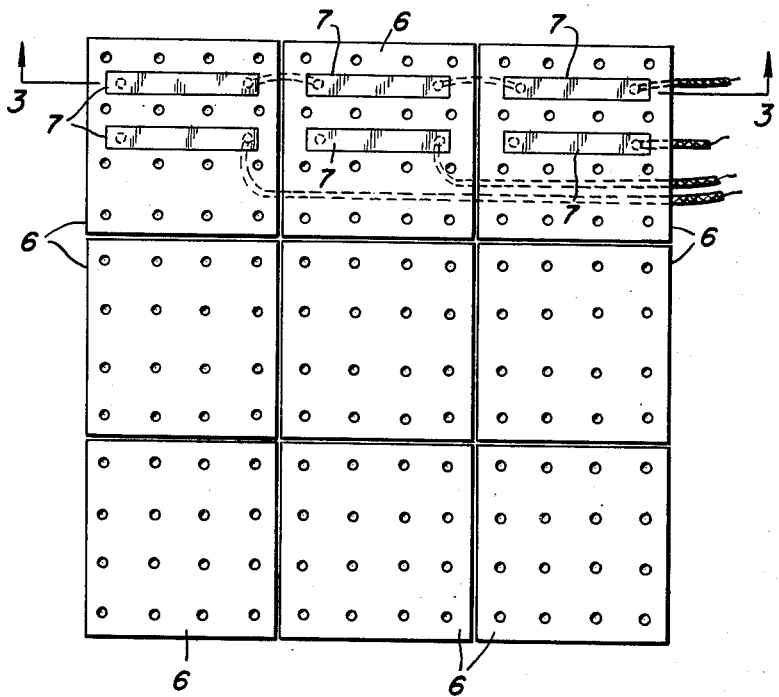
Figure 2 is a plan view of the sectional plate forming part of the furnace grate and carrying the electrodes of the present device.
Figure 3:
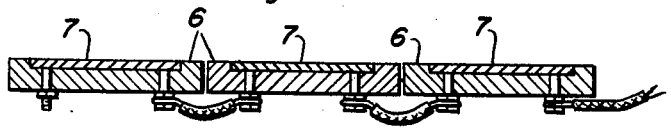
Figure 3 is a vertical transverse section taken on a line 3—3 of Figure 2.
Figure 4:
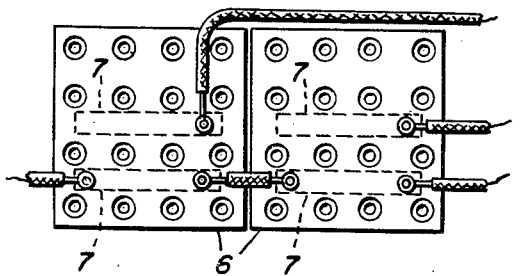
Figure 4 is an inverted plan view showing two of the electrode carrying sections of the grate.

Referring in detail to the drawings, the present invention is shown in connection with a water heating furnace or boiler at F having a rearwardly inclined grate G along which solid fuel is fed rearwardly from a stoker S, the grate including a perforated plate disposed on and supported by bars 5 and being composed of a plurality of similar sections 6 arranged in edge to edge relation and in rows longitudinally and transversely of the furnace. The plate sections 6 are preferably made of silicon carbide, which is a refractory material that is a good heat conductor and electrical insulator.

A pair of spaced inlaid electrodes 7 is provided in the upper surface of one or more of the plate sections 6 at the higher end of the grate, each electrode preferably consisting of a strip of metal which is a good electrical conductor. As shown, there are three plate sections 6 in each transverse row, and each section in the front row is provided with a pair of electrodes. The pairs of electrodes are wired in multiple or parallel in a load circuit 8, and an overload responsive thermal switch 9 controls the flow of current to an electrode of each pair. The type of thermal switch used is preferably that shown in U. S. Patent No. 2,008,443, issued to E. J. Schaefer on July 27, 1937.

Operation of the device is subject to an electrically actuated control means of the type shown in U. S. Patent No. 1,973,925 issued to I. E. McCabe on September 18, 1934. This means includes an aquastat A of the type which automatically closes a circuit when the temperature of the water in the boiler descends below any selected predetermined degree and opens the circuit when the temperature rises to or ascends above another predetermined degree. The degrees selected will, of course, depend upon the requirements under which the boiler is used. The fixed coil 10 of a relay is included in a control circuit controlled by the aquastat, and a movable coil 11 of said relay is operatively associated with two mercury tube switches 12 which open and close the respective line wires 13 and 13' to the load circuit. The arrangement is such that the aquastat opens the control circuit when the temperature rises to or ascends above a predetermined degree. This de-energizes the fixed coil 10 and allows the coil 11 to move away from the coil 10 and tilt the mercury tube switches 12 into open position, thereby opening both line wires to the load circuit. On the other hand, when the temperature descends below a predetermined degree, the aquastat closes the control circuit so that coil 10 is energized by current induced therein, thus setting up an electrical attraction of one coil for the other. This causes coil 11 to be pulled or attracted to coil 10 so as to tilt the mercury tube switches 12 into closed position, thereby closing both line wires to the load circuit. Obviously, when the load circuit is open, no current passes across the gap between the pairs of electrodes, and the fuel igniting device is inoperative. Conversely, when the load circuit is closed, current passes across the gaps between the pairs of electrodes and the fuel igniting device is operative. As long as the aquastat remains open, no current is induced in the coil 10, and the coil 11 remains away from coil 10 and keeps the mercury tube switches tilted to open the load circuit.

On the other hand, as long as the aquastat remains closed, current is induced in coil 10 and the coil 11 is held in engagement with coil 10 to keep the load circuit closed. Thus, when the main switch 14 is closed and the fire becomes low or is to be started, the igniting device is rendered and kept operative until the fuel is ignited to a point where the required combustion takes place. As soon as the required combustion takes place, the igniting device is rendered inoperative and remains so until the fire becomes low again. Should the load circuit become overloaded by reason of interposition of undue conductance between any pair of electrodes from any cause, the supply of current to that pair of electrodes will be automatically cut off by the associated thermal switch 9. Contiguous lumps of coal contacting and lying between the electrodes of each pair will conduct current across the gap between said electrodes and, due to the resistance of said lumps, they will be rendered incandescent and will be ignited. This will take place as the fuel is fed onto the grate so as to provide a good bed of burning fuel.

From the foregoing description, it is believed that the construction, operation and advantages of the present invention will be readily understood and appreciated by those skilled in the art. Modifications and changes in details of construction are contemplated, such as fairly fall within the spirit of the invention as claimed.

What is claimed as new is:

1. In combination, a furnace having a grate, a pair of spaced electrically insulated electrodes carried by and exposed at the top surface of the grate, said electrodes being included in a load circuit, and electrically operated normally open switch means responsive to a predetermined low furnace temperature for closing said load circuit.

2. In combination, a furnace having a grate, a pair of spaced electrically insulated electrodes carried by and exposed at the top surface of the grate, said electrodes being included in a load circuit, and normally open and electrically closed switch means responsive to a predetermined low furnace temperature for controlling said load circuit.

3. In combination, a furnace having a grate, a pair of spaced electrically insulated electrodes carried by and exposed at the top surface of the grate, said electrodes being included in a load circuit, electrically operated normally open switch means responsive to a predetermined low furnace temperature for closing said load circuit, and an overload responsive switch in the load circuit for controlling the flow of current to one of said electrodes.

4. In combination, a furnace having a grate, a pair of spaced electrically insulated electrodes carried by and exposed at the top surface of the grate, said electrodes being included in a load circuit, and normally open and electrically closed switch means responsive to a predetermined low furnace temperature for closing both of two line wires to the load circuit.

5. In combination, a furnace having a rearwardly inclined grate including a suitably supported perforated grate plate of a refractory insulating material, a pair of spaced electrically insulated electrodes carried by and exposed at the top surface of the grate plate at the higher end of the grate, said electrodes being included in a load circuit, and electrically operated normally open switch means responsive to a predetermined low furnace temperature for closing said load circuit.

6. In combination, a furnace having a grate including a rearwardly inclined perforated grate plate, said grate plate comprising sections arranged in transverse rows and made of refractory electrical insulation, a pair of spaced electrically insulated electrodes carried by and exposed at the top surface of each of the plate sections in the row at the front of the grate, said pairs of electrodes being included in parallel in a load circuit, and normally open and electrically closed switch means responsive to a predetermined low furnace temperature for controlling said load circuit.

7. The construction defined in claim 6, in combination with an overload responsive switch for controlling the flow of current to one electrode of each pair.

GEORGE C. MOLOTZAK.

REFERENCES CITED

The following references are of record in the file of this patent:

UNITED STATES PATENTS

| Number | Name | Date |
| --- | --- | --- |
| 1,527,252 | Rohn et al. | Feb. 24, 1925 |
| 2,210,720 | Johnson et al. | Aug. 6, 1940 |
| 2,234,004 | Lamm | Mar. 4, 1941 |
| 2,385,811 | Hotchkiss | Oct. 2, 1945 |